(12) United States Patent
Kazuyoshi

(10) Patent No.: US 7,554,641 B2
(45) Date of Patent: Jun. 30, 2009

(54) LIQUID CRYSTAL DISPLAY DEVICE AND METHOD OF FABRICATING THEREOF

(75) Inventor: Nagayama Kazuyoshi, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 235 days.

(21) Appl. No.: 11/643,937

(22) Filed: Dec. 22, 2006

(65) Prior Publication Data

US 2007/0188691 A1    Aug. 16, 2007

(30) Foreign Application Priority Data

Dec. 28, 2005   (JP)   ............... P2005-378500

(51) Int. Cl.
*G02F 1/1343*   (2006.01)
(52) U.S. Cl. ..................... 349/141; 349/146
(58) Field of Classification Search .......... 349/139–148
See application file for complete search history.

(56) References Cited

U.S. PATENT DOCUMENTS

| | | | |
|---|---|---|---|
| 5,162,933 A | 11/1992 | Kakuda et al. | |
| 5,317,433 A | 5/1994 | Miyawaki et al. | |
| 5,339,181 A | 8/1994 | Kim et al. | |
| 5,462,887 A | 10/1995 | Gluck | |
| 5,668,379 A | 9/1997 | Ono et al. | |
| 5,731,856 A | 3/1998 | Kim et al. | |
| 5,771,083 A | 6/1998 | Fujihara et al. | |
| 5,793,460 A | 8/1998 | Yang | |
| 5,847,781 A | 12/1998 | Ono et al. | |
| 7,139,059 B2* | 11/2006 | Kim ........................ | 349/141 |
| 7,345,728 B2* | 3/2008 | Lee et al. .................. | 349/141 |
| 2005/0068483 A1 | 3/2005 | Lee et al. | |
| 2005/0110930 A1 | 5/2005 | Kim | |

FOREIGN PATENT DOCUMENTS

| | | |
|---|---|---|
| CN | 1601359 | 3/2005 |
| CN | 1621924 | 6/2005 |
| JP | 2005-107535 | 4/2005 |

* cited by examiner

*Primary Examiner*—Kevin S Wood
(74) *Attorney, Agent, or Firm*—McKenna Long & Aldridge LLP

(57) ABSTRACT

A liquid crystal display device is disclosed that may prevent crosstalk from occurring. The liquid crystal display device includes pixel and common electrodes forming a fringe field, wherein the pixel electrodes are substantially in parallel over the common electrode and the pixel electrodes are connected with one another in a central portion.

8 Claims, 4 Drawing Sheets

US 7,554,641 B2

LIQUID CRYSTAL DISPLAY DEVICE AND METHOD OF FABRICATING THEREOF

This application claims the benefit of Japanese Patent Application No. JP2005-378500, filed on Dec. 28, 2005, which is hereby incorporated by reference for all purposes as if fully set forth herein.

BACKGROUND OF THE INVENTION

1. Field of the Invention

The present invention relates to a liquid crystal display (LCD) device and method of fabricating thereof, and more particularly, to a fringe field switching (FFS) mode LCD device.

2. Discussion of the Related Art

FFS mode LCD devices have recently been developed in which a horizontal electric field is applied parallel to a substrate in the same manner as an IPS mode LCD device.

The FFS mode LCD device may include a transparent common electrode and a transparent pixel electrode wherein an interval between the pixel and common electrodes may be substantially smaller than a cell gap between lower and upper substrates of an LCD panel. Thus, a fringe field is formed.

Because of an electric field generated in the fringe field, liquid crystal molecules of a liquid crystal layer are driven. In comparison with the IPS (In-Plane Switching) mode LCD device, the FFS mode LCD device has a higher aperture ratio and higher transmittance. For example, this is disclosed in Japanese Laid-Open Patent Publication No. 2005-107535.

However, the related art FFS mode LCD device suffers from the following disadvantages.

In the related art FFS mode LCD device, crosstalk occurs because of the electric field of a signal line resulting from the structure of the pixel and common electrodes.

SUMMARY OF THE INVENTION

Accordingly, the present invention is directed to an FFS mode LCD device and method of fabricating thereof, which substantially obviates one or more problems due to limitations and disadvantages of the related art.

An aspect of the present invention is to provide an FFS mode LCD device that may prevent crosstalk from occurring.

Additional features and advantages of the present invention will be set forth in the description which follows, and in part will be apparent from the description or may be learned from practice of the invention. These other advantages of the invention will be realized and attained by the structure particularly pointed out in the written description and claims hereof as well as the appended drawings.

To achieve these and other advantages and in accordance with the purpose of the invention, as embodied and broadly described herein, a liquid crystal display device includes pixel and common electrodes forming a fringe field, wherein the pixel electrodes are substantially in parallel over the common electrode, and the pixel electrodes are connected with one another in a central portion.

In another aspect of the present invention, a liquid crystal display device includes a common electrode in a pixel region, a plurality of pixel electrodes forming a fringe field with the common electrode in the pixel region, and a connection line connected with the plurality of pixel electrodes, wherein the plurality of pixel electrodes are substantially in parallel, and a distance between two ends of adjacent pixel electrodes is substantially different from a distance between two central portions of the adjacent pixel electrodes.

In yet another aspect of the present invention, a method of fabricating a liquid crystal display device includes forming a common electrode in a pixel region; forming a plurality of pixel electrodes in the pixel region, the common and pixel electrodes forming a fringe field; and forming a connection line connected with the plurality of pixel electrodes, wherein the plurality of pixel electrodes are substantially in parallel, and a distance between two ends of adjacent pixel electrodes is substantially different from a distance between two central portions of the adjacent pixel electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain in the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, an FFS mode LCD device according to the present invention will be described with reference to the accompanying drawings.

Figure 1:
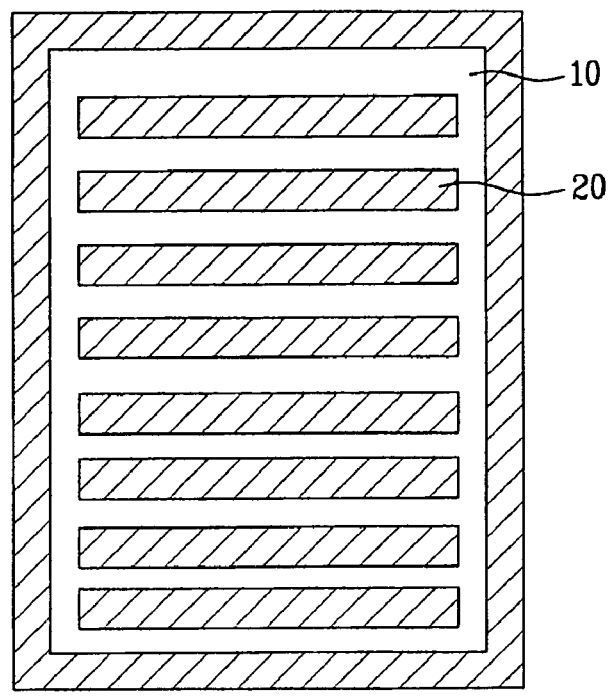
FIG. 1 is a plan view illustrating a pixel electrode and a common electrode in a unit pixel of an FFS mode LCD device according to the related art, for comparison with an FFS mode LCD device according to the present invention.

FIG. 1 is a plan view illustrating a pixel electrode and a common electrode in a unit pixel of the related art.

As shown in FIG. 1, pixel electrodes 10 are over a common electrode 20, and the pixel electrodes 10 are connected with one another through both ends. A white voltage is applied to the end of the common electrode 20.

Thus, the portion corresponding to the end of the common electrode 20 may be darker than the portion corresponding to the center of the common electrode 20, whereby crosstalk occurs in the end of the common electrode 20 in comparison with the center of the common electrode 20.

Figure 2:
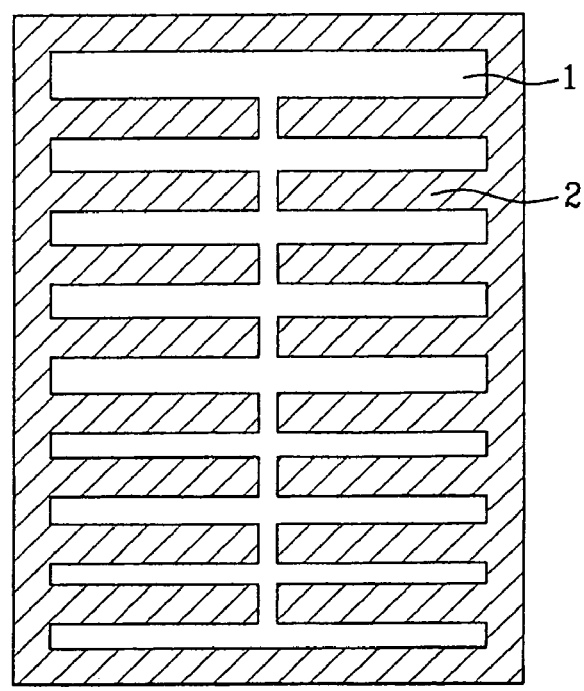
FIG. 2 is a plan view illustrating a pixel electrode and a common electrode in a unit pixel of an FFS mode LCD device according to the present invention.

In order to prevent crosstalk from occurring, the FFS mode LCD device of the present invention has a pixel electrode 1 which is shaped substantially as shown in FIG. 2.

As shown in FIG. 2, the pixel electrodes 1 are over a common electrode 2, the pixel electrodes have a substantially plane shape, and the pixel electrodes 1 are connected with one another through one central connection line. As a result, each end of the common electrode 2 is positioned substantially adjacent to the center of the pixel electrode 1.

In FIG. 1, the common electrode 20 has two ends positioned at the left and right sides thereof. However, in the present invention, the common electrode 2 may have one end substantially at the center thereof, as shown in FIG. 2, so that dark sides are halved, thereby preventing crosstalk from occurring by a signal line electric field.

Figure 3:
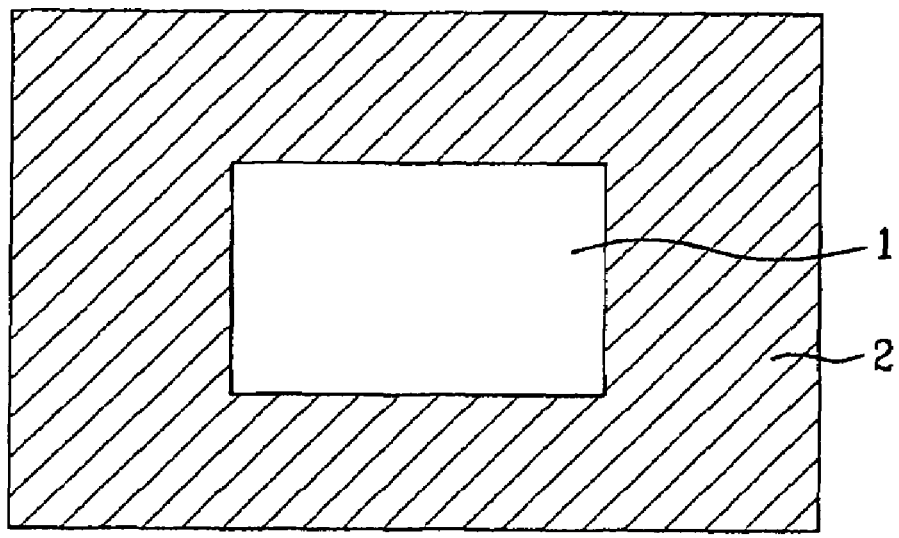
FIG. 3 is a plan view illustrating that a vertical crosstalk may occur in both ends of a pixel electrode for an FFS mode LCD device because of the pixel and common electrode structure.

However, vertical crosstalk may occur in the pattern of the pixel electrode 1 shown in FIG. 2. In FIG. 3, vertical crosstalk may occur in both ends of the pixel electrode 1 for the FFS mode LCD device.

Figure 4:
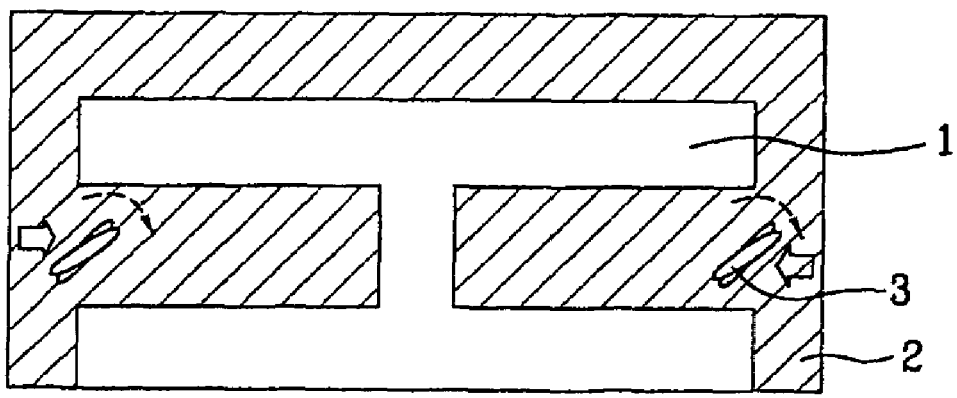
FIG. 4 is a plan view illustrating a cause of vertical crosstalk.

FIG. 4 illustrates a potential cause of vertical crosstalk. Because a white voltage is applied to half of the signal line, the liquid crystal molecules 3 rotate towards the right, and become darker, whereby crosstalk may occur.

Figure 5:
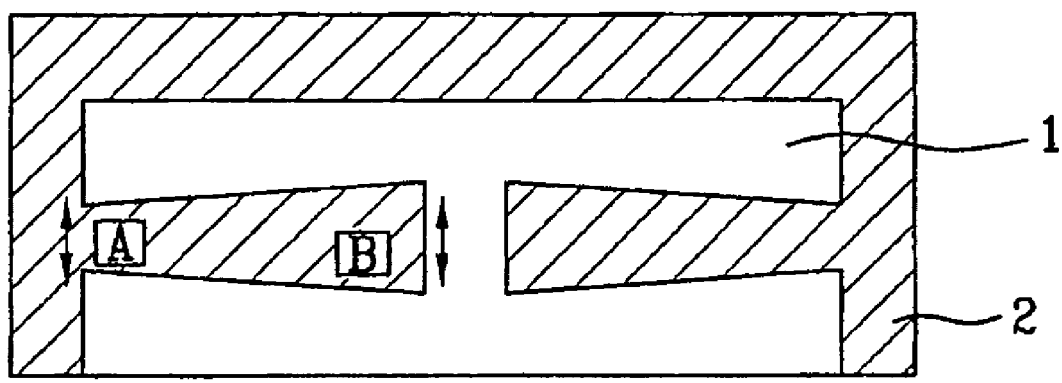
FIG. 5 illustrates a first embodiment of a pixel electrode for an FFS mode LCD device according to the present invention.

In the FFS mode LCD device of the present invention, as shown in FIG. 5, a distance 'A' between two ends of adjacent pixel electrodes 1 may be substantially smaller than a distance 'B' between two central portions of adjacent pixel electrodes 1. Accordingly, the end portions of the pixel electrodes 1 form a relatively strong electric field such that they are not affected by the signal line.

Figure 6:
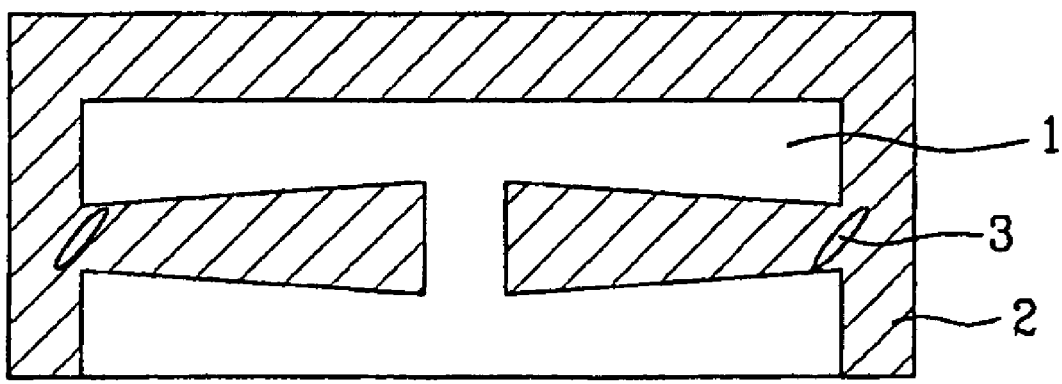
FIG. 6 illustrates a second embodiment of a pixel electrode for an FFS mode LCD device according to the present invention.
Figure 7:
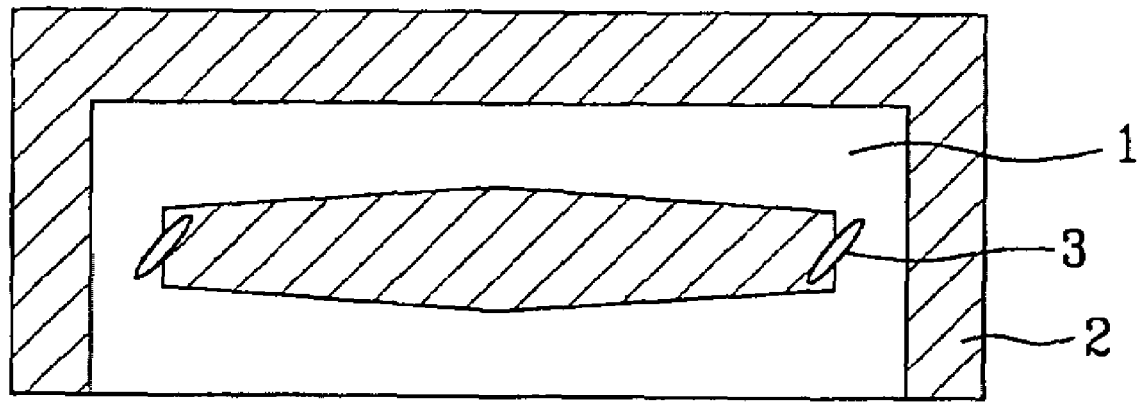
FIG. 7 illustrates a third embodiment of a pixel electrode for an FFS mode LCD device according to the present invention.

FIGS. 6 and 7 illustrate various shapes of the pixel electrode 1.

In FIG. 6, each pixel electrode 1 may be provided with an end which is substantially wider than the central portion. That is, a distance between two ends of the adjacent pixel electrodes 1 may be substantially smaller than a distance between two central portions of the adjacent pixel electrode 1.

In FIG. 7, the central portion of the pixel electrode 1 may be substantially thinner than the end of the pixel electrode 1. That is, a distance between two ends of the adjacent pixel electrodes 1 may be substantially smaller than a distance between two central portions of the adjacent pixel electrode 1. The pixel electrodes 1 may be connected with one another through connection lines in both ends of the pixel electrodes 1.

In the above-mentioned FFS mode LCD device, when arranging the pixel electrodes 1, the distance between the two ends of the adjacent pixel electrodes may be substantially smaller than the distance between the two central portions of the adjacent pixel electrodes. Accordingly, the end portions of the pixel electrodes 1 may create a relatively strong electric field, so that they are not affected by the electric field of the signal line.

As mentioned above, the FFS mode LCD device according to the present invention has the following advantages.

In the FFS mode LCD device according to the present invention, the pixel electrodes may be substantially in parallel over the common electrode and the pixel electrodes may be connected with one another through the one central connection line, so that crosstalk may be prevented from occurring without the interference of the electric field of each signal line.

Also, in the FFS mode LCD device according to the present invention, the distance between the two ends of the adjacent pixel electrodes may be substantially smaller than the distance between the two central portions of the adjacent pixel electrodes, so that crosstalk may be prevented from occurring without the interference of the electric field of each signal line.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
    pixel and common electrodes forming a fringe field in a pixel,
    wherein the pixel electrodes are formed in parallel over the common electrode, and the pixel electrodes are connected with one another in a central portion and the pixel electrodes overlaps over the common electrode for forming the fringe field, and
    further wherein a width between two ends of the adjacent pixel electrodes is smaller than a width between two central portions of the adjacent pixel electrodes in the pixel.

2. The device of claim 1, wherein the width of the end of pixel electrode is larger than the width of the central portion of pixel electrode.

3. The device of claim 1, wherein the width of the central portion of pixel electrode is smaller than the width of the end of each pixel electrode.

4. The device of claim 1, wherein the pixel electrodes have a plane shape.

5. A method of fabricating for a liquid crystal display device, comprising:
    forming a common electrode in a pixel; and
    forming a plurality of pixel electrodes in parallel over the common electrode, and a central connection line connected with the plurality of pixel electrodes over the common electrode in a central portion of the pixel, wherein the common and pixel electrodes, including the connection line, forms a fringe field, wherein the pixel electrodes and the connection line overlap over the common electrode in the pixel; and
    further wherein a width between two ends of the adjacent pixel electrodes, among the plurality of pixel electrodes in parallel, is smaller than a width between two central portion of the adjacent pixel electrodes.

6. The method of claim 5, wherein the width of the end of pixel electrode is larger than the width of the central portion of pixel electrode.

7. The method of claim 5, wherein the width of the central portion of pixel electrode is smaller than the width of the end of the pixel electrode.

8. The method of claim 5, wherein the pixel electrodes are formed in a plane shape.

* * * * *